(12) United States Patent
Chick

(10) Patent No.: US 7,117,914 B2
(45) Date of Patent: *Oct. 10, 2006

(54) NON-AUTOCLAVE LAMINATED GLASS

(75) Inventor: James Allen Chick, Amery, WI (US)

(73) Assignee: Cardinal LG Company, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/943,797

(22) Filed: Sep. 17, 2004

(65) Prior Publication Data

US 2005/0103426 A1    May 19, 2005

Related U.S. Application Data

(63) Continuation-in-part of application No. 10/393,197, filed on Mar. 20, 2003.

(51) Int. Cl.
  *B32B 17/10* (2006.01)
  *B32B 32/26* (2006.01)
  *B32B 32/28* (2006.01)
  *C03C 27/12* (2006.01)

(52) U.S. Cl. .................. 156/499; 156/538; 156/555; 156/580; 156/582

(58) Field of Classification Search .................. 156/99, 156/103, 106, 272.2, 273.9, 274.2, 275.7, 156/312, 350, 358–359, 367–368, 379.6, 156/380.9, 381, 499, 538–539, 555, 580, 156/582; B32B 17/10, 32/26, 32/28; C03C 27/12
See application file for complete search history.

(56) References Cited

U.S. PATENT DOCUMENTS

| | | |
|---|---|---|
| 2,106,766 A | 12/1934 | Sherts et al. |
| 2,163,648 A | 6/1939 | Watkins et al. |
| 2,182,358 A * | 12/1939 | Sherts et al. ................. 156/382 |
| 2,235,958 A * | 3/1941 | Boicey ........................ 156/103 |
| 2,673,168 A | 3/1954 | Pascoe et al. |
| 2,685,548 A | 8/1954 | Drozdowski |
| 3,234,062 A | 2/1966 | Morris |
| 3,952,135 A | 4/1976 | Priddle et al. |
| 4,030,961 A | 6/1977 | Straeten et al. |
| 4,103,070 A | 7/1978 | Ammons |
| 4,174,241 A | 11/1979 | Rockar et al. |
| 4,204,029 A | 5/1980 | Batchelor et al. |
| 4,309,484 A | 1/1982 | Ohmae et al. |
| 4,327,634 A | 5/1982 | Colmon et al. |
| 4,397,976 A | 8/1983 | Mori et al. |
| 4,668,574 A | 5/1987 | Bolton et al. |
| 4,675,237 A | 6/1987 | Bravet et al. |
| 4,824,722 A | 4/1989 | Jarrett |
| 4,828,784 A | 5/1989 | Hahn |
| 4,906,703 A | 3/1990 | Bolton et al. |
| 4,988,398 A | 1/1991 | Pereman et al. |
| 4,999,071 A | 3/1991 | Nakamura et al. |
| 5,002,820 A | 3/1991 | Bolton et al. |

(Continued)

FOREIGN PATENT DOCUMENTS

EP      0707950      3/2000

(Continued)

*Primary Examiner*—Jessica Rossi
(74) *Attorney, Agent, or Firm*—Fredikson & Byron, P.A.

(57) ABSTRACT

The invention provides a non-autoclave method and apparatus for producing laminated glass. The method and apparatus provide a non-autoclave laminated glass process that is continuous and thus eliminates the batch processing of known autoclave processes. In addition, the method and equipment do not require vacuum processes, involving complicated vacuum bags, vacuum rings, or the like.

14 Claims, 9 Drawing Sheets

U.S. PATENT DOCUMENTS

| | | |
|---|---|---|
| 5,300,184 A | 4/1994 | Masunaga |
| 5,340,654 A | 8/1994 | Ueda et al. |
| 5,415,909 A | 5/1995 | Shohi et al. |
| 5,496,640 A | 3/1996 | Bolton et al. |
| 5,536,347 A | 7/1996 | Moran |
| 5,698,053 A | 12/1997 | Carroll et al. |
| 5,759,698 A | 6/1998 | Tanuma et al. |
| 5,763,062 A | 6/1998 | Smith et al. |
| 5,895,721 A | 4/1999 | Naoumenko et al. |
| 5,912,082 A | 6/1999 | Park et al. |
| 6,096,148 A | 8/2000 | Kingma |
| 6,127,032 A | 10/2000 | Kelch et al. |
| 6,237,306 B1 | 5/2001 | Dlubak |
| 6,329,061 B1 | 12/2001 | Kondo |
| 6,336,490 B1 | 1/2002 | Balduin et al. |
| 6,353,042 B1 | 3/2002 | Hanoka et al. |
| 6,361,101 B1 | 3/2002 | Yoshizawa |
| 6,387,516 B1 | 5/2002 | Shichiri et al. |
| 6,413,618 B1 | 7/2002 | Parker et al. |
| 6,419,734 B1 | 7/2002 | Naomenko et al. |
| 6,506,487 B1 | 1/2003 | Nagai |
| 2003/0148114 A1 | 8/2003 | Bourcier et al. |

FOREIGN PATENT DOCUMENTS

| | | |
|---|---|---|
| WO | WO 88/03517 | 5/1988 |
| WO | WO 91/01880 | 2/1991 |
| WO | WO 98/40324 | 9/1998 |
| WO | WO04/085148 | 10/2004 |

* cited by examiner

US 7,117,914 B2

NON-AUTOCLAVE LAMINATED GLASS

CROSS-REFERENCE TO RELATED APPLICATION

The present application is a continuation-in-part of, and claims priority to, U.S. patent application filed Mar. 20, 2003 and assigned Ser. No. 10/393,197, the entire disclosure of which is incorporated herein by reference.

FIELD OF THE INVENTION

The present invention relates generally to laminated glass and methods and equipment for producing such glass. More particularly, this invention relates to non-autoclave laminated glass and methods and equipment for producing such glass.

BACKGROUND OF THE INVENTION

Laminated glass is widely utilized in industry, most notably for motor vehicle windshields and other safety glass. Generally, laminated glass comprises two sheet-like substrates (e.g., glass sheets) and an interlayer (e.g., a tear-resistant plastic) positioned between the two substrates. An advantage of using laminated glass is that, when impacted by an object, the laminated glass retains its overall structural integrity and reduces the occurrence of flying glass resulting from glass breakage. Using laminated glass for motor vehicle windows, for example, helps ensure the safety of drivers and passengers in the event of accidents. Similarly, using laminated glass in other safety glass applications (hurricane glass, blast-resistant glass, etc.) helps ensure the safety of bystanders and property.

Generally, the manufacture of laminated glass is known to involve two operations: (1) an assembly operation, and (2) an autoclave operation. In the assembly operation, the interlayer is positioned between two glass substrates to form a sandwich, which is then heated (commonly to a temperature of between about 120° F. and about 170° F.) and roller pressed to initiate removal of air trapped between the interlayer and to initiate adhesion of the interlayer to the glass. In the autoclave operation, the sandwich is exposed to an elevated temperature (commonly between about 275° F. and about 300° F.) and an elevated atmospheric pressure (commonly between about 150 psig and about 190 psig) until there is complete adhesion of the interlayer to the glass and complete dissolution of air trapped within the interlayer. It is not uncommon for the autoclave operation to last two hours to four hours per treatment.

One of the major drawbacks of manufacturing laminated glass with an autoclave method is the long autoclave operation time. Conventional autoclave methods are batch processes. As a result, they are limited in terms of throughput by the batch processing requirements of the autoclave. As noted above, it commonly takes about two to four hours, depending on batch size, for a batch of laminates to be autoclaved. It would be desirable to provide a continuous (i.e., non-batch) method for producing laminated glass.

A related drawback of producing autoclaved laminated glass is that defects in the laminated glass sometimes do not appear until after the laminated glass has been autoclaved. For example, manufacturers commonly have to wait about two hours, and sometimes about four hours, for each batch of autoclaved laminated glass before detecting any unexpected defects that may appear. Thus, it would be desirable to provide a continuous non-autoclave process.

Non-autoclave laminated glass is disclosed in U.S. Pat. No. 5,536,347 (Moran), and U.S. Pat. No. 3,234,062 (Morris), the entire teachings of each of which are incorporated herein by reference. While these references disclose non-autoclave laminated glass, both have significant limitations. For example, both references disclose vacuum processes wherein complicated vacuum bags, vacuum rings, or the like are used. It would be desirable to provide a non-autoclave laminated glass method that can be preferred under ambient atmospheric conditions and that does not require vacuum bags, vacuum rings, or any other complicated devices.

SUMMARY OF THE INVENTION

The invention provides a non-autoclave method and apparatus for producing laminated glass. The method and apparatus provide a non-autoclave laminated glass process that is continuous and thus eliminates the batch processing of known autoclave processes. In addition, the method and equipment do not require vacuum processes, involving complicated vacuum bags, vacuum rings, or the like.

Certain embodiments of the invention provide a method of producing non-autoclave laminated glass. A laminated glass panel is provided comprising a desired interlayer sandwiched between at least two sheet-like substrates. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of between about 200 degrees Fahrenheit and about 235 degrees Fahrenheit in a single pass along the path of substrate travel.

Also, certain embodiments of the invention provide a production line for producing non-autoclave laminated glass. The production line comprises a plurality (at least two, optionally at least four, and in some cases at least six, e.g., between six and nine) of ovens each followed by at least one pair of confronting press members between which laminated glass panels can be positioned during pressing operations. A substrate support defines a path of substrate travel extending through the ovens and between each pair of confronting press members. The ovens are adapted for heating a laminated glass panel to a temperature (e.g., a maximum temperature) of between about 200 degrees Fahrenheit and about 235 degrees Fahrenheit in a single pass along the path of substrate travel.

Additionally, certain embodiments of the invention provide a method of producing non-autoclave laminated glass. A laminated glass panel is provided comprising a desired interlayer sandwiched between at least two sheet-like substrates. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of at least about 200 degrees Fahrenheit in a single pass along the path of substrate travel and/or in a single pass through the production line. The operation of the press members in the present embodiments preferably provides a foot path of at least about 0.5 inch (and optionally at least about 3 inches) on the laminated glass panel during a pressing operation.

Further, certain embodiments of the invention provide a method of producing non-autoclave laminated glass. A laminated glass panel is provided comprising a desired interlayer sandwiched between at least two sheet-like substrates. A production line is provided comprising a plurality of ovens each followed by at least one pair of confronting press members, wherein a substrate support (e.g., comprising one or more transport roller beds) defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of at least about 200 degrees Fahrenheit in a single pass along the path of substrate travel. In the present embodiments, each pair of confronting press members is preferably mounted to provide a separation distance smaller than a thickness of the laminated glass panel by between about 0.05 inch and about 0.20 inch.

Also, certain embodiments of the invention provide a method of producing non-autoclave laminated glass. A laminated glass panel is provided comprising a desired interlayer sandwiched between at least two sheet-like substrates. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of at least about 200 degrees Fahrenheit in a single pass along the path of substrate travel. In the present embodiments, the press rollers preferably are operated such that a pressure of between about 140 pounds per linear inch and about 160 pounds per linear inch is applied to the laminated glass panel.

Additionally, certain embodiments of the invention provide a method of producing non-autoclave laminated glass. A laminated glass panel is provided comprising a desired interlayer sandwiched between at least two sheet-like substrates. In the present embodiments, a production line is provided comprising at least five (and optionally at least six) ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of at least about 200 degrees Fahrenheit in a single pass along the path of substrate travel.

Further, certain embodiments of the invention provide a method of producing non-autoclave laminated glass. A laminated glass panel is provided comprising a desired interlayer sandwiched between at least two sheet-like substrates. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of at least about 200 degrees Fahrenheit in a single pass along the path of substrate travel. The present embodiments optionally involve the process features described in the remainder of this paragraph. Operation of a first of the pairs of confronting press members is performed while the laminated glass panel is at a temperature of between about 120 degrees Fahrenheit and about 150 degrees Fahrenheit. Operation of a second of the pairs of confronting press members is performed while the laminated glass panel is at a temperature of between about 140 degrees Fahrenheit and about 170 degrees Fahrenheit. Operation of a third of the pairs of confronting press members is performed while the laminated glass panel is at a temperature of between about 160 degrees Fahrenheit and about 190 degrees Fahrenheit. Operation of a fourth of the pairs of confronting press members is performed while the laminated glass panel is at a temperature of between about 180 degrees Fahrenheit and about 210 degrees Fahrenheit. Operation of a fifth of the pairs of confronting press members is performed while the laminated glass panel is at a temperature of between about 200 degrees Fahrenheit and about 230 degrees Fahrenheit. Operation of a sixth of the pairs of confronting press members is performed while the laminated glass panel is at a temperature of between about 220 degrees Fahrenheit and about 250 degrees Fahrenheit.

Also, certain embodiments of the invention provide a method of producing non-autoclave laminated glass. A laminated glass panel is provided comprising an ionoplast interlayer sandwiched between at least two glass sheets. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. In the present embodiments, the operation of the ovens preferably delivers enough heat to the laminated glass panel to bring it to a temperature of at least about 200 degrees Fahrenheit (e.g., between about 200° F. and about 235° F.) in a single pass along the path of substrate travel.

DETAILED DESCRIPTION OF PREFERRED EMBODIMENTS

Figure 1:
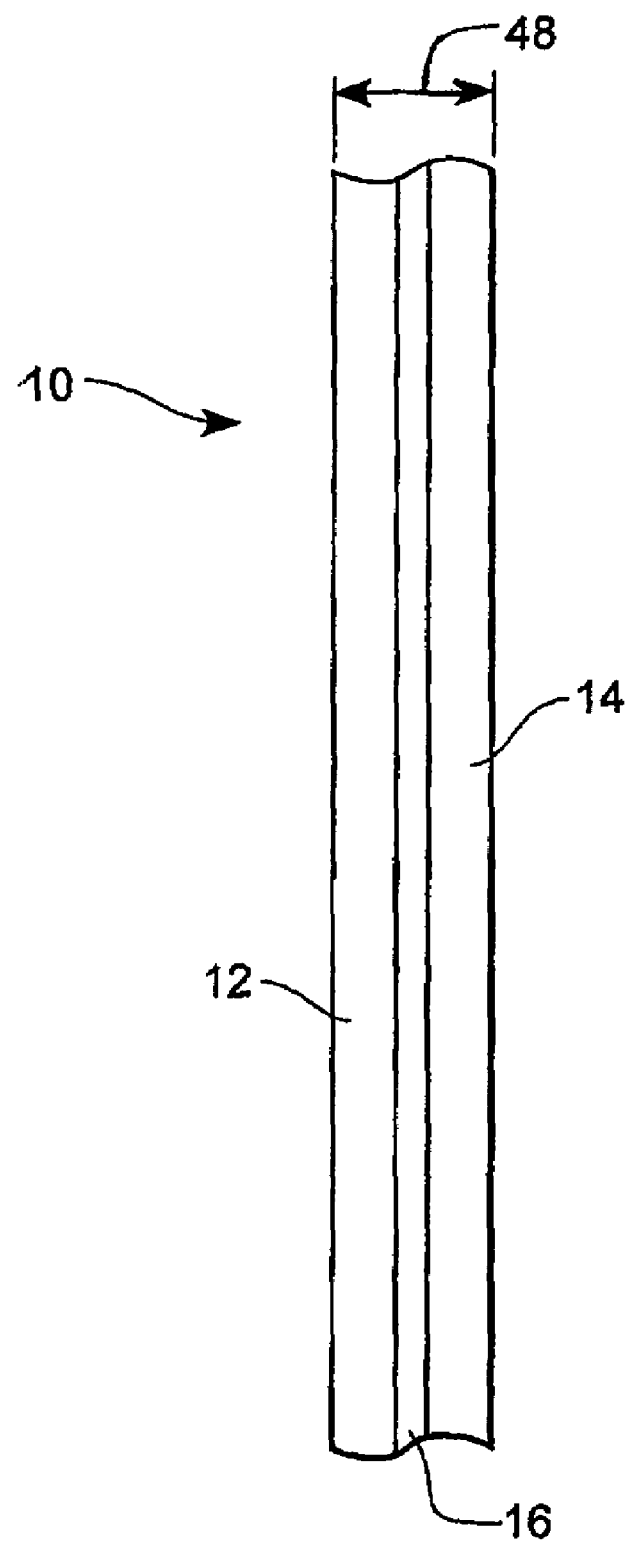
FIG. 1 is a side view of a laminated glass panel.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides non-autoclave methods and production lines for producing laminated glass. In the present methods, there is provided a laminated glass panel (or "laminated glazing panel"). The panel comprises a desired interlayer sandwiched between two sheet-like substrates. Typically, the substrates are glass sheets. However, plastic and other types of substrates can also be used. Thus, although the term "laminated glass panel" is used herein, the sheet-like substrates in such a panel can be formed of materials other than glass. FIG. 1 schematically illustrates the layered construction of such a laminated glass panel 10. The panel 10 includes a first sheet-like substrate 12 bonded to a second sheet-like substrate 14 by an intermediate tear-resistant plastic film (or "interlayer") 16. In certain preferred embodiments, before the laminate is conveyed through the production line, the first sheet-like substrate has a thickness of between about 0.063 inch and about 0.224 inch, the second sheet-like substrate has a thickness of between about 0.063 inch and about 0.224 inch, and the intermediate tear-resistant plastic film has a thickness of between about 0.015 inch and about 0.180 inch. In certain particularly preferred embodiments, the interlayer 16 is (or comprises) a film of (or comprising) ionoplast plastic, as described below. Other preferred embodiments utilize an interlayer of polyvinylbutyral (PVB). In certain general embodiments of the invention, any desired interlayer material 16 can be used. Other useful materials for the interlayer 16 include urethane, silicone, etc. Generally, these materials are easily accessible. When being used with the process and/or production line described herein, in certain embodiments, these materials require and involve no prior conditioning or specific composition parameters (e.g., certain water content percentages) to be applicable hereto.

As noted above, an ionoplast material is used for the interlayer 16 in certain particularly preferred embodiments. Ionoplast material is available commercially from Dupont (Wilmington, Del., U.S.A.), under the trade name Sentry Glas® Plus. The inventors have discovered that using an ionoplast material as the interlayer 16 in the present non-autoclave glass provides a surprising degree of flexibility in terms of the process parameters that can be used to produce laminates with optimal safety and appearance properties. For example, using an ionoplast interlayer provides exceptional flexibility to vary the laminate speed, the oven temperatures, the length of the production line, and the foot path dimensions. Thus, embodiments of the invention wherein the interlayer 16 comprises an ionoplast material are particularly advantageous. As described above, other non-ionoplast materials can be used instead of ionoplast for the interlayer 16. In using these other non-ionoplast materials, the process parameters (e.g., line speed, oven temperatures, production line length, foot path dimensions, etc.) can also be varied in producing laminates that have optimal safety and appearance properties. However, by using the ionoplast material, commercial advantages can additionally be achieved in producing the laminated glass panels 10. For example, in order to achieve desired safety standards for a particular application, laminated glass panels that have interlayers of conventional materials may be produced with thicker substrates or using substrates having increased heat strength properties to achieve the desired safety and appearance properties. This is generally not the case when producing laminated glass panels 10 with the ionoplast material as the interlayer 16. The same, if not better, safety and appearance properties can be achieved for the laminated glass panels 10 using thinner first and second sheet-like substrates than in certain other embodiments involving non-ionoplast materials. In turn, in embodiments involving the ionoplast material, the laminated glass panels 10 have lesser thicknesses and weights than corresponding conventional units, yet exhibit similar, if not enhanced, safety properties when compared to the conventional units.

In certain embodiments of the invention, the techniques by which heat and pressure are both applied in creating the laminated glass panels 10, through the use of the production line and/or the manufacturing process described herein, are advantageous, inter alia, because the laminated glass panels 10 can be produced so as to offer excellent safety and appearance properties. In addition, the use of the production line and/or the manufacturing process enables the production of the laminates to be a consistent, constant process. As such, the line and/or process provides reliability, by which the laminated glass panels 10 produced have little overall variance. As a result, the instances in which laminates are produced with defects is limited. Given the high reliability of the process, certain aspects of the process can be varied while still producing laminated glass panels that meet desired safety and appearance standards. For example, the speed at which the laminated glass panels 10 are conveyed through the production line can be varied. With the consistency of the production process of the invention, the line speed can vary slightly without unacceptably affecting the quality of the laminates produced by the process. Further, in certain embodiments, the line speed can be greatly varied (e.g., increased) so as to vary (e.g., increase) the rate of production of the laminated glass panels 10. As described below, if a given aspect is greatly varied, the process allows one to accordingly vary one or more other aspects (e.g., temperature, pressure, etc.) to ensure the laminated glass panels 10 produced still meet desired safety and appearance standards.

Figure 2:
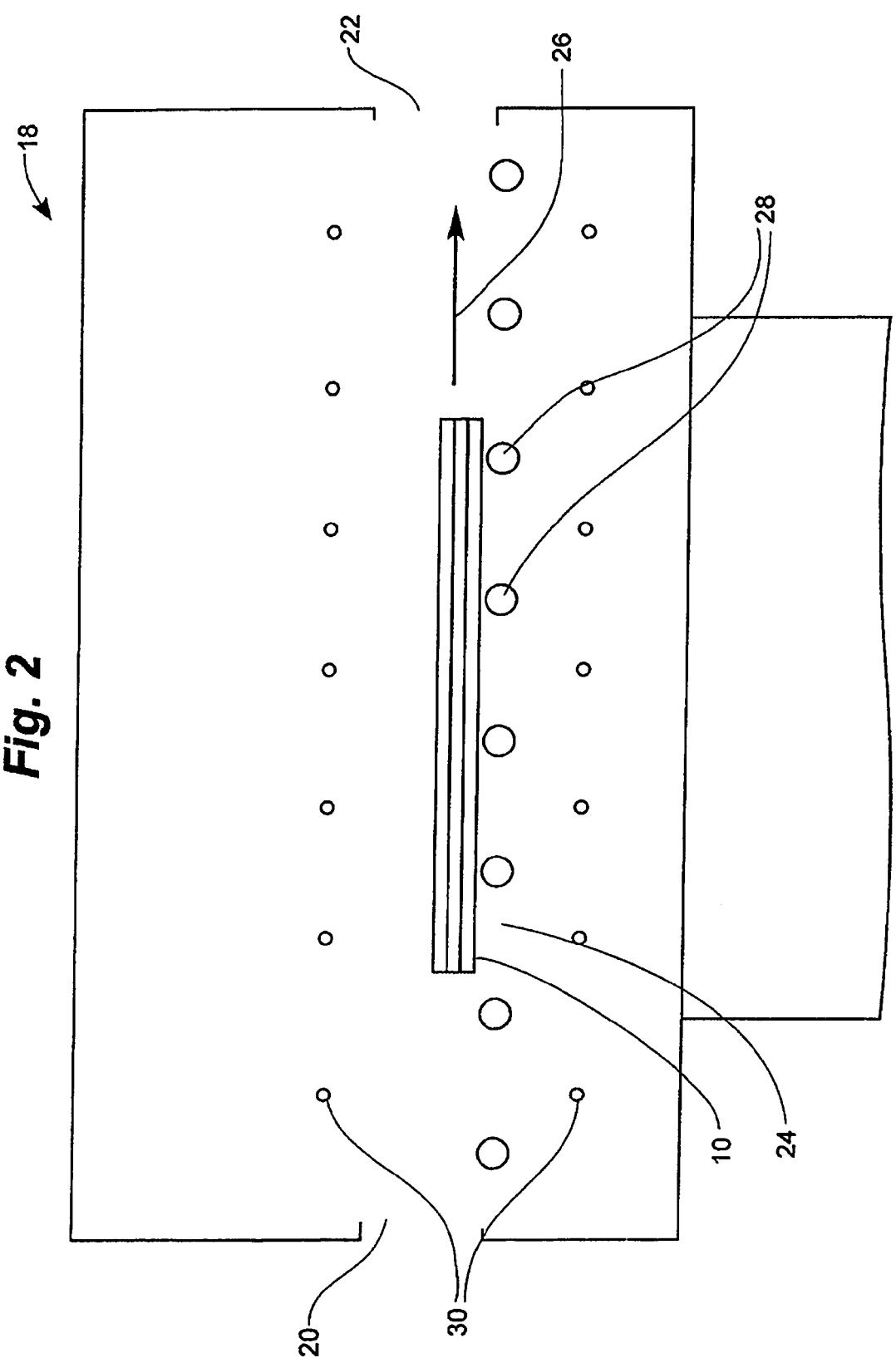
FIG. 2 is a schematic, cross-sectional side view of an oven in accordance with certain embodiments of the invention.

The production line used in the present invention preferably comprises a plurality of ovens. In certain preferred embodiments, the production line includes at least three ovens. In certain particularly preferred embodiments, the production line includes at least six ovens (e.g., between six and nine ovens). The ovens preferably are commercially available pre-heat and tacking ovens. FIG. 2 is a cross-sectional side view of such an oven 18 in accordance with certain embodiments of the invention. As shown, the oven 18 has an inlet opening 20 and an outlet opening 22. A substrate support 24 defines a path of substrate travel 26, a portion of which extends from the inlet opening 20, through the oven 18, and to the outlet opening 22. Preferably, the substrate support 24 comprises a plurality of spaced-apart transport rollers 28 that are adapted to convey the laminated glass panel 10 along the path of substrate travel 26. Preferably, at least some of the transport rollers 28 in each oven 18 are operatively coupled to one or more motors (not shown), such that the motorized rollers are adapted to convey the laminated glass panel 10 along the path of substrate travel 26. In certain particularly preferred embodiments, at least some of the motors are variable speed motors, which allow the laminated glass panel 10 to be conveyed through different ovens at different rates. When producing laminated glass panels 10 comprising substrates of various sizes and thicknesses, heat intake by the panels 10 is generally found to vary. As such, the production process can advantageously be varied to ensure that the laminated glass panels 10 produced still meet desired safety and appearance standards. In these embodiments, it has been discovered that the production of panels 10 of different sizes is generally better controlled by adjusting the conveyor speed rather than the oven temperatures. As such, the oven temperatures can generally be kept constant, while the speed at which the laminated glass panels 10 are conveyed through the production line is varied to produce acceptable panels 10. Generally, the line speed is lowered when producing panels 10 having thick substrates, and the line speed is raised when producing panels 10 having thinner substrates. Preferably, the thus-motorized rollers are adapted to convey the laminated glass panel 10 at an overall rate greater than about 15 feet per minute, and perhaps more preferably greater than about 20 feet per minute. However, even though the rollers can optionally be adapted to convey the laminated glass panel 10 at such speeds, the overall rate of the production line can be varied as desired and need not be so high. In embodiments wherein the substrate support 24 comprises transport rollers 28, the production method typically comprises conveying (and thus transporting) the laminated glass panel along the rollers 28.

Preferably, the ovens 18 are radiant ovens each having at least one heating element 30. In the embodiment of FIG. 2, the oven includes a plurality of spaced-apart heating elements 30, which are preferably positioned below and/or above the path of substrate travel 26. Various types of heating elements can be used such as rod and coil, suspended coil, spiral-wound, or tubular types. In certain preferred embodiments, the heating elements 30 are quartz tube heating elements. For example, the heating elements 30 can be tubular quartz medium range infrared heaters operating over a wavelength range of between about 2.5 microns and about 2.7 microns with a wattage density of about 45 watts per linear inch. By their design, quartz tube heating elements possess specific heating characteristics that are well suited for the laminating process. The optional quartz tube heating elements are engineered to maximize the focus of energy into the interlayer and not the substrates that sandwich the interlayer. As a result, the amount of energy used by the ovens as part of the manufacturing process is kept to a minimum since it is not necessary to use excess energy to heat the air space in the ovens or the glass substrates passing through the ovens when heating the interlayer between the substrates. Preferably, the heating elements 30 are configured in a high intensity heating pattern, although the heating elements 30 can be configured in a medium intensity heating pattern, and even in a low intensity heating pattern if desirable in some embodiments. Typically, the heating elements 30 are mounted to, and extend from, walls of the radiant oven 18 in which they are located. In certain particularly preferred embodiments, the ovens 18 have independent temperature controls such that different ovens 18 can be operated at different temperatures. Useful ovens 18 of the desired nature are commercially available from Casso Solar (Pomona, N.Y., U.S.A.).

Figure 3:
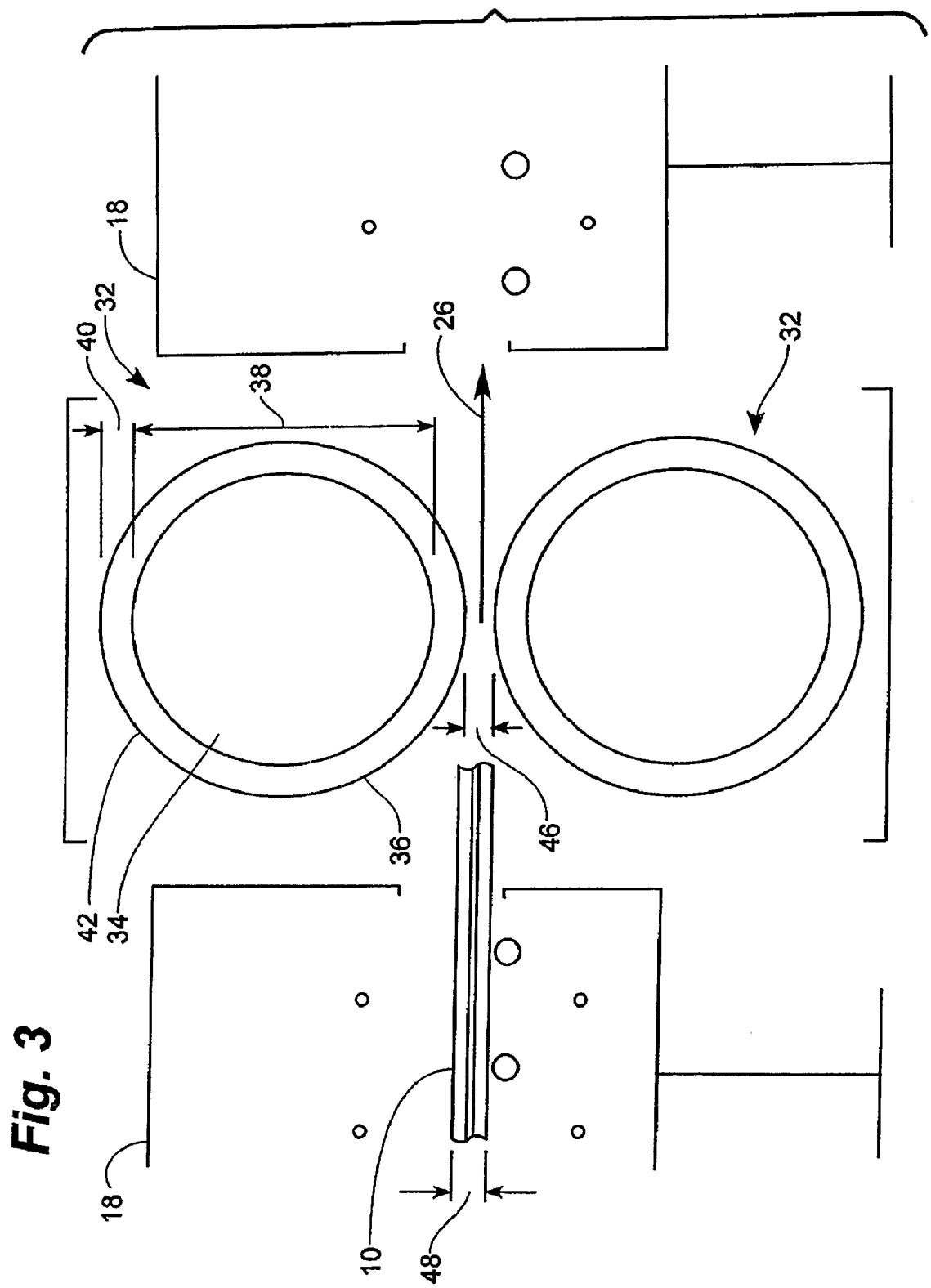
FIG. 3 is a schematic, cross-sectional side view of a pair of confronting press members in accordance with certain embodiments of the invention.

Thus, the production line preferably includes a plurality of ovens 18. Each oven 18 is preferably followed by at least one pair of confronting press members between which the laminated glass panel 10 can be positioned (e.g., conveyed) during a pressing operation. The confronting press members can be confronting nip rollers (or "press rolls"), platen presses, or other press members that are adapted to deliver energy (e.g., by applying pressure) to the laminated glass panels during a pressing operation. Preferably, the confronting press members are nip rollers. FIG. 3 exemplifies a pair of confronting press members 32 of this nature. By using nip rollers 32 in the production line, the laminated glass panel 10 can be moved continuously along the path of substrate travel 26, without having to interrupt the conveyance of the panel 10 to perform pressing operations. Thus, in certain methods of the invention, the laminated glass panel 10 is conveyed on a continuous, uninterrupted basis through each of the ovens 18 and between each pair of confronting nip rollers 32. Thus, the path of substrate travel 26 preferably extends through each oven 18 and between each pair of confronting press members 32.

In embodiments wherein the press members comprise nip rollers, each roller 32 typically comprises a rigid cylinder 34 (e.g. having walls of steel) with a relatively soft roll cover 36, as is perhaps best appreciated with reference to FIG. 3. The diameter 38 of the rigid cylinder 34 can be varied as desired. In certain embodiments, the diameter 38 is preferably at least about 12 inches, perhaps more preferably at least about 14 inches, and perhaps optimally at least about 16 inches. The radial thickness 40 of the roll cover 36 can also be varied as desired. Generally, the radial thickness is at least about 0.5 inch. In certain embodiments, the radial thickness 40 is preferably at least about 1.5 inches, perhaps more preferably at least about 1.75 inches, and perhaps optimally at least about 2.0 inches. In certain particularly preferred embodiments, the roll cover is formed of material having a durometer of about 60, although this is by no means required for all embodiments of the invention. In certain embodiments, the roll cover 36 comprises rubber (perhaps optimally having the described durometer), although other materials can be used (e.g., plastic or the like). In certain embodiments, the roll cover 36 comprises EPDM (ethylene propylene diene monomer), a durable rubber that exhibits high tensile strength and excellent resistance to punctures, UV radiation, weathering and microbial attack. EPDM is also a highly flexible material having a low co-efficient of thermal expansion and contraction, which enables the material to be used effectively as an outer covering 36 for nip rollers 32. The outer surface 42 of the roll cover 36 is patterned similar to the tread of an automobile tire, having a plurality of intersecting grooves cut across its outer surface. The outer surface 42 can comprise a variety of different tread patterns. In certain embodiments of the invention, the tread pattern 44 (shown in FIG. 4) comprises a grid having a pair of groove sets, with each groove set comprising a plurality of channels that are oriented parallel to each other and that are equally spaced across the roll cover 36. Further, the groove sets are preferably positioned over each other (e.g., so as to intersect) such that their combination forms a plurality of squares or diamonds (e.g., having grooves therebetween) defining the outer surface 42 of the roll cover 36.

Figure 4:
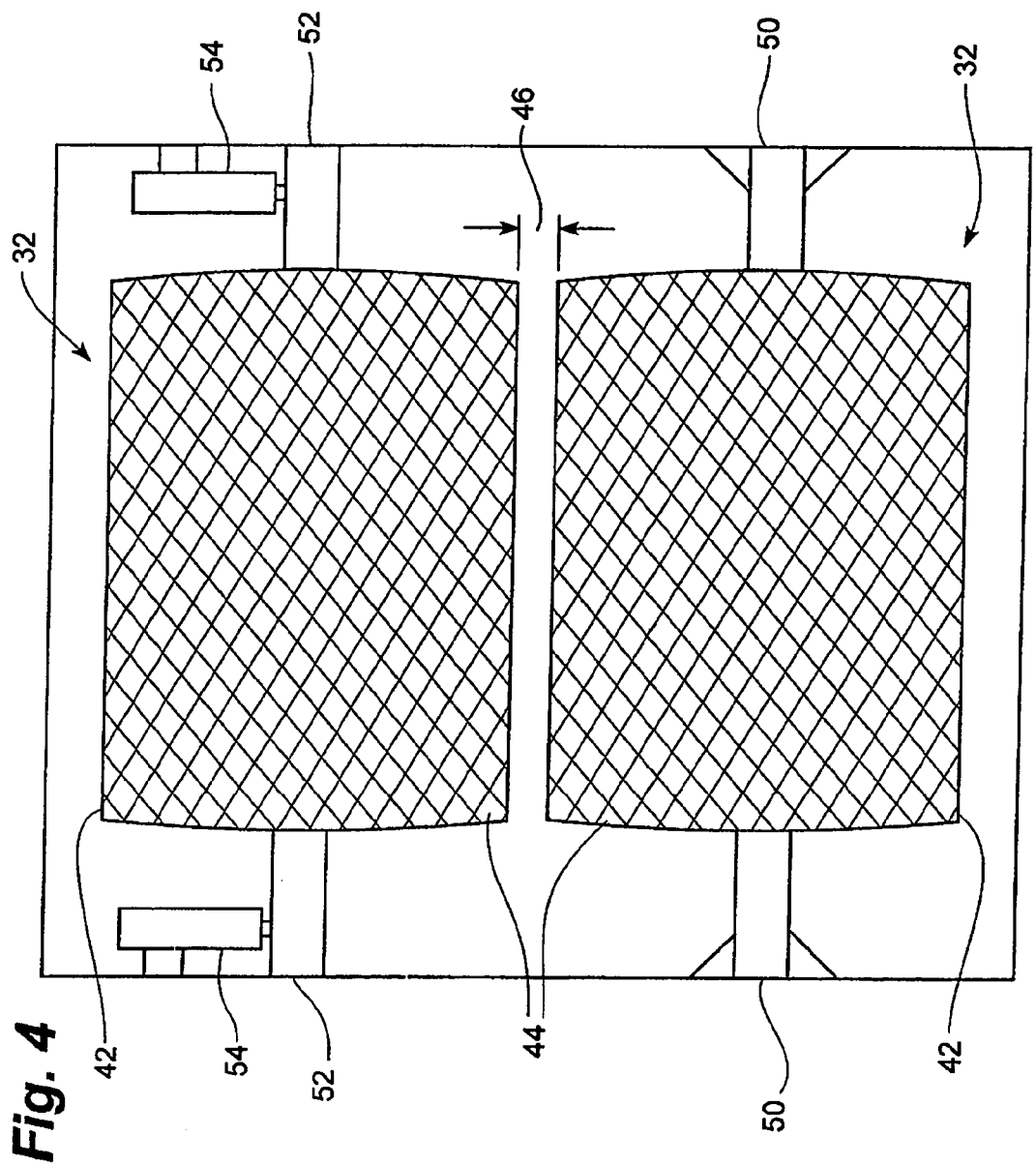
FIG. 4 is a schematic, front view of a pair of confronting press members in accordance with certain embodiments of the invention.

In the embodiments of FIGS. 3 and 4, each pair of confronting nip rollers 32 is mounted to provide a desired separation distance 46 (i.e., a gap exists between the confronting surfaces of the nip rollers 32). The separation distance 46 is defined as the distance between the two confronting surfaces (i.e., the vertical dimension of the gap between the rollers of each confronting pair, when no laminated glass panel is between the rollers). Typically, each pair of confronting nip rollers 32 has a separation distance 46 that is smaller than the thickness 48 of the laminated glass panel 10. Thus, when the laminated glass panel 10 is conveyed between the nip rollers 32, energy is delivered into the panel 10 to dissolve air trapped between the interlayer 16 and the substrates 12 and 14 and to enable the interlayer 16 to become further adhered to the substrates 12 and 14. In preferred embodiments, the separation distance 46 between the rollers 32 is smaller than the thickness of the laminated glass panel 10 by between about 0.05 inch and about 0.2 inch.

FIG. 4 is a front view of a pair of confronting nip rollers 32 wherein corresponding axles 50, 52 and air cylinders 54 are exemplified. As illustrated, each nip roller 32 has an axle 50 or 52 about which each corresponding roller 32 is rotatable. Preferably, the upper nip rollers 32 are each operatively coupled to at least one air cylinder 54 that is operated to apply downward pressure to the corresponding upper nip roller 32 during press operations. In so doing, each air cylinder 52 is utilized via the nip rollers 32 to apply pressure to (and thus to deliver increased energy into) the laminated glass panel. Commonly, one roller of each confronting pair has its axle fixed (such that this roller is not movable vertically), while the other roller is movable vertically. For example, the movable roller may have its axle held by elastic members operatively coupled either from above and/or below the roller. The elastic members are either extended, i.e., if located above, or compressed, i.e., if located below, such that the corresponding roller is mounted an initial vertical distance (i.e., the separation distance 46) away from immediately adjacent roller. Preferably, the movable roller has at least one air cylinder operatively coupled to its axle. In the embodiment of FIG. 4, the axle 50 of the lower nip roller is fixed and the axle 52 of the upper nip roller is operatively coupled to a pair of air cylinders 54. One air cylinder 54 is located on each end of the axle 52 of the upper nip roller. By applying air pressure evenly on both ends of the axle 52 via the air cylinders 54, the upper roller applies an even amount of pressure across the laminated glass panel, such that roller cant is prevented.

The air cylinders 54 are preferably 6 inch or 8 inch air cylinders. However, it is contemplated that cylinders of smaller size will be used in some embodiments. The air cylinders 54 utilized in certain embodiments of the present invention are believed to be larger than these used in conventional laminated glass production methods. The pressure applied by the nip rollers on the surface of a laminated glass panel can be varied as desired. Generally, the air cylinders 54 are operated such that the pressure applied by the nip rollers on the surface of a laminated glass panel during a pressing operation is between about 20 pounds per linear inch and about 250 pounds per linear inch. In some embodiments, the air cylinders 54 are operated such that the pressure applied by the nip rollers on the surface of a laminated glass panel during a pressing operation is between about 60 pounds per linear inch and about 120 pounds per linear inch, e.g., between about 80 pounds per linear inch and about 85 pounds per linear inch. Other embodiments involve higher pressures, as described below.

Figure 5:
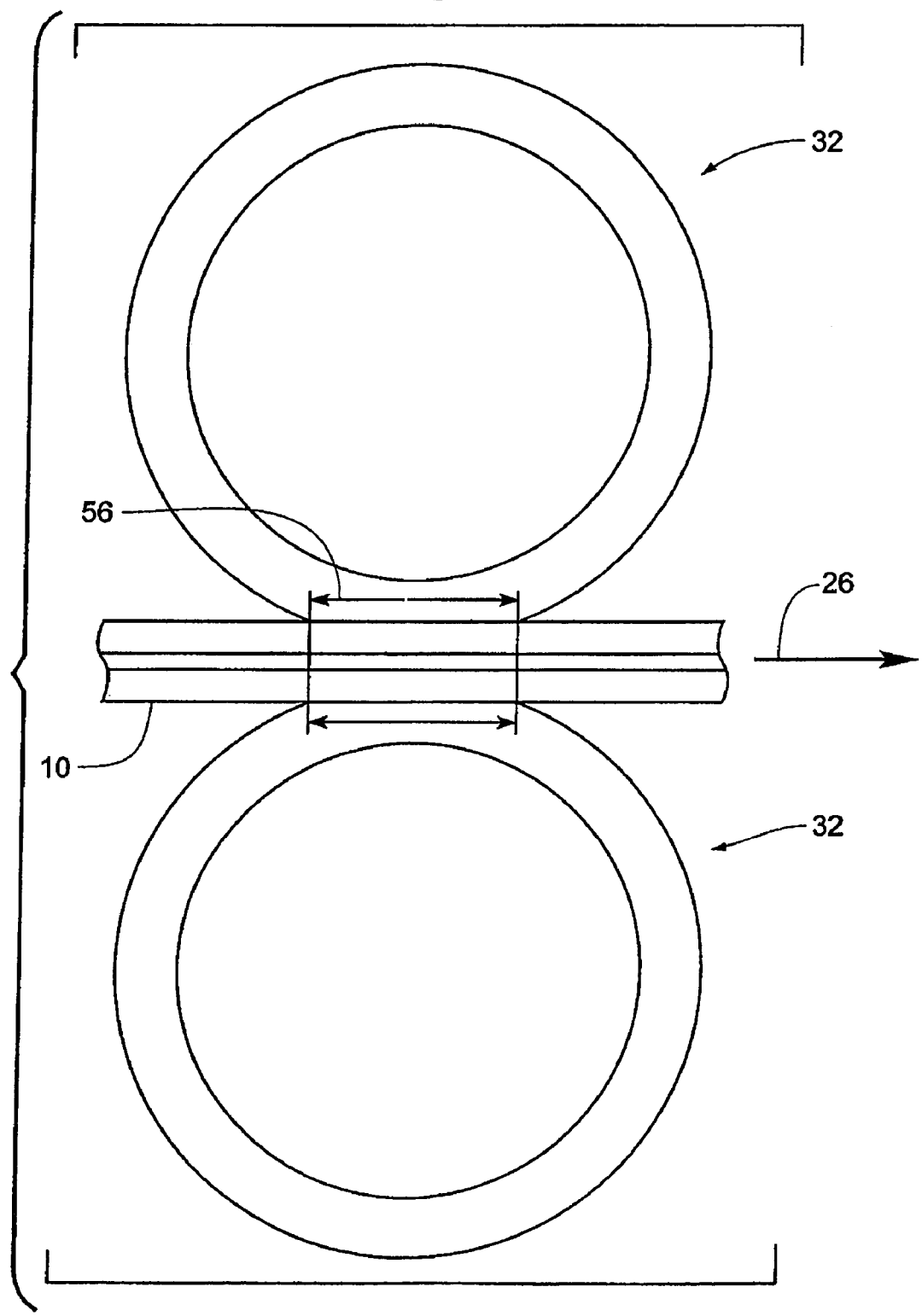
FIG. 5 is a schematic, cross-sectional side view of a pair of confronting press members in accordance with certain embodiments of the invention.

FIG. 5 is a schematic cross-sectional side view of a pair of confronting press members 32 during a pressing operation on a laminated glass panel 10. The invention facilitates conveying laminated glass panels 10 along the path of substrate travel 26 at an exceptionally high speed, as compared to line speeds on conventional laminated glass production lines. However, even though the conveyance of the laminated glass panels 10 at such an exceptionally high speed can be facilitated, in certain embodiments, the line speeds are generally kept similar to conventional laminated glass production lines. To assure enough energy is delivered into the laminates during their conveyance along the line, certain preferred embodiments of the invention provide nip rollers 32 that each provide a particularly large foot path 56. As shown, the foot path 56 is the surface distance along the laminate 10 (i.e., measured parallel to the path of substrate travel 26) that is in direct physical contact with a nip roller 32 at a given moment in time. In certain embodiments of the invention, the foot path 56 during a pressing operation is at least about 0.5 inch, perhaps more preferably at least about 1 inch, and perhaps optimally at least about 2 inches. The process parameters that are advantageous for the present non-autoclave technology have been discovered through extensive effort. Process parameters including the amount of pressure applied to the laminated glass panel 10 and the duration of time the pressure is applied to the panel 10 desirably are balanced in order to produce laminated glass panels 10 with the properties desired for a given application. In certain embodiments, if the footpath is shortened, the speed of the line generally is optionally decreased to ensure adequate pressure is exerted over the panel for at least a certain amount of time. Conversely, if the footpath length is extended, as embodied above, the area of the panel 10 that has pressure applied thereon at any given time is also increased. As a result, every area of the panel 10 has pressure applied thereon by the nip rollers for a longer time period because of the extended footpath length. In turn, the line speed can be raised to increase the efficiency of the line (in terms of product amount produced per time period) while still providing enough pressure to produce panels 10 having the properties desired. Useful nip rollers 32 of the desired nature are commercially available from Champion Roller (Rock Hill, S.C., U.S.A.).

In one particular embodiment of the invention, the following arrangement is used for each pair of confronting nip rollers: steel cylinders each having a diameter of about 16 inches and roll covers (comprising EPDM rubber having a durometer of about 60 and the described tread pattern) each having a radial thickness of about 2.0 inches, wherein each pair of confronting nip rollers is mounted to provide a separation distance of about 0.1 inch, with the laminated glass panel having a thickness of about 0.3 inch.

Thus, the production line preferably includes a plurality of ovens each followed by at least one pair of confronting press members. The term oven is used herein to refer to a heating zone through which a laminated glass panel is conveyed on an uninterrupted basis before and/or after being acted upon by confronting press members. If so desired, one or more of the ovens/heating zones can be disposed within a common housing. In certain embodiments, the ovens/heating zones are each disposed in (e.g., bounded or defined by) separate housings, each followed by at least one pair of confronting press members (e.g., which optionally are not entirely encased by any such housing).

The particular design parameters of the production line described herein, optionally involving a plurality of ovens and respective pairs of confronting press members, contribute to the overall quality, consistency, and reliability of the process. In various embodiments of the production line and process, a surprisingly advantageous balance of temperature, pressure, and speed is achieved, producing laminates that meet desirable safety and appearance properties. Such balance can effectively minimize the overall amount of energy needed to achieve proper adherence of the interlayer to the surrounding substrates. In addition, such balance can effectively minimize the amount of pressure applied to eliminate unwanted air from the interlayer. Further, in using the optional production line, a time element is provided to the process which enables the laminates 10 produced to have minimal occurrence of defects or variance. As a result, the process of producing the laminated glass panels 10 using a production line can be repeated, in certain embodiments, repeated continuously, with minimal chance of producing panels 10 that are defective. While it may be possible to produce laminated glass panels using fewer numbers of ovens and press member pairs than described in certain embodiments herein, such a process may be less stable and less consistent in producing laminates. Further, the time element of the process described herein provides one with the ability to vary certain process parameters along the production line without compromising the quality of the panels 10 produced therefrom.

As noted above, the path of substrate travel extends through the ovens and between each pair of confronting press members. The ovens are preferably adapted for heating a laminated glass panel to a temperature of at least about 255 degrees Farenheit in a single pass along the path of substrate travel. In contrast, in conventional autoclave methods, the laminated glass panels are brought to a temperature of about 120° F.–170° F. when conveyed through the preheat tacking oven or ovens.

The path of substrate travel preferably has a length of at least about 40 feet, and perhaps more preferably at least about 50 feet. In certain particularly preferred embodiments, the length of the path of substrate travel is between about 55 feet and about 95 feet. Preferably, the laminated glass panels are transported (e.g., conveyed) along substantially the entire length of the path of substrate travel (preferably without stopping the laminated glass panels along the way). The length of the present production line is much greater than the length of laminated glass production lines used in conventional autoclave processes. This increased line length (especially when provided in combination with increased foot path and/or increased air cylinder pressure) enables the laminated glass panels to be conveyed much more rapidly than in conventional laminated glass production methods.

Figure 6:
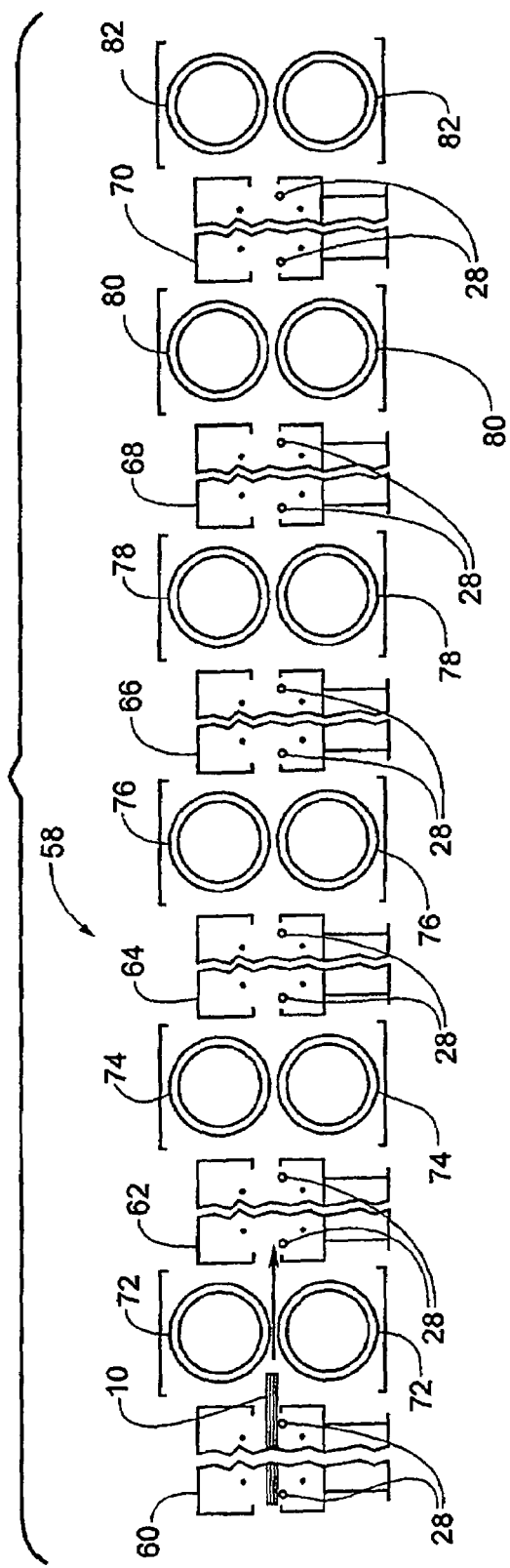
FIG. 6 is a partially broken away, schematic, cross-sectional side view of a production line in accordance with certain embodiments of the invention.

As noted above, the production line preferably includes at least three ovens, perhaps more preferably at least six ovens, and perhaps optimally between six and nine ovens. In conventional autoclave methods, a production line having one or two ovens is used, whereafter the laminated glass panels are treated in an autoclave to complete their production. FIG. 6 is a schematic cross-sectional side view of a production line 58 in accordance with certain embodiments of the present invention, wherein at least six ovens are provided. Here, the production line 58 may include only the illustrated six ovens, or additional ovens (e.g., one to three additional ovens) can be provided. In certain particularly preferred embodiments, the production line includes a first oven 60 having a length of about 20 feet (i.e., bounding a portion of the path of substrate travel about 20 feet in length), a second oven 62 having a length of about 10 feet, a third oven 64 having a length of about 10 feet, a fourth oven 66 having a length of about 10 feet, a fifth oven 68 having a length of about 10 feet, and a sixth oven 70 having a length of about 10 feet. In certain preferred embodiments, the ovens have independent temperature controls that allow different ovens to be operated at different temperatures. In these embodiments, the ovens can be set to different interior temperatures, such that the laminated glass panel 10 can be exposed to different levels of heating when conveyed through different ovens. Accordingly, in certain methods of the invention, the ovens are operated at different temperatures. Conjointly, the transport rollers 28 in the ovens preferably are adapted to convey laminated glass panels 10 through different ovens at different speeds, as well as through different pairs of confronting press members at different speeds. For example, at least some of the transport rollers 28 preferably are operatively connected to variable speed motors. Thus, in certain methods of the invention, the laminated glass panel 10 is conveyed through different ovens at different rates. Similarly, when the confronting press members are nip rollers, these rollers are preferably adapted for running at different rotational speeds. The ability to both vary the temperatures in each oven as well as vary the speeds at which the laminated glass panel is conveyed through each oven and each pair of confronting press members is critical to the process. Only by warming the laminated glass panel within the precise ranges of temperatures and by applying the precise amount of pressure over a given amount of time can air existing within the laminated glass panel be completely evacuated.

The non-autoclave methods of the invention include providing a laminated glass panel comprising a desired interlayer sandwiched between at least two sheet-like substrates. (As noted above, the laminated glass panel is provided with an ionoplast layer in certain particularly advantageous embodiments.) The methods preferably include providing a production line comprising a plurality of ovens each followed by at least one pair of confronting press members, wherein a substrate support defining a path of substrate travel extends along the production line. The laminated glass panel is conveyed along the path of substrate travel (and is thus transported through the ovens and between each pair of confronting press members) while the ovens and press members are operated. Operating the ovens delivers heat to the laminated glass panel and operating the press members applies pressure to the laminated glass panel. In certain embodiments, the laminated glass panel is conveyed along the path of substrate travel while the ovens are operated such that the laminated glass panel preferably is brought to a temperature of at least about 200 degrees Fahrenheit (at least about 255° F. in some cases) in a single pass along the path of substrate travel. Perhaps more preferably, the laminated glass panel is heated to a temperature of between about 210° F. and about 235° F. (between about 270° F. and about 300° F. in some cases) during a single pass along the path of substrate travel. The laminate can then optionally be conveyed into a cooling hood, where the temperature of the laminated glass panel is lowered at a precise rate. For example, in certain embodiments, the temperature of the laminated glass panel is cooled at a rate of no greater than 100° F. per minute. The laminated glass panel preferably is not cooled too quickly to avoid thermal shock, as could potentially compromise safety and appearance properties of the panel. In certain embodiments, once the laminated glass panel is cooled adequately, the panel is conveyed from the cooling hood, and subsequently packaged. As such, the laminated glass panel can optionally be assembled, adhered, cooled, and packaged on a continuous, uninterrupted basis using the production line as described above.

The laminated glass panel can be conveyed along the path of substrate travel at surprisingly high rates in the present method. For example, the laminated glass panel is preferably conveyed at an overall rate greater than about 15 feet per minute, and perhaps preferably greater than about 20 feet per minute. As noted above, the laminated glass panel can be conveyed along the path of substrate travel by operating motorized transport rollers, in which case these motorized rollers preferably are operated (i.e., rotated) so as to convey the laminated glass panel at the described high rates. However, as also noted, the rollers are operated at these high rates only if so desired. Other particularly preferred embodiments involve significantly slower conveyance speeds.

As noted above, the production line in certain embodiments comprises at least three ovens (perhaps more preferably at least six ovens and perhaps optimally between six and nine ovens) each followed by at least one pair of confronting press members. In these embodiments, the production method involves conveying the laminated glass panel through each of the ovens and between each pair of confronting press members (i.e., between confronting surfaces of the rollers of each pair).

In certain methods, pressing operations are performed on the laminated glass panel by the confronting press members (e.g., nip rollers) when the panel is at particular temperatures. This is perhaps best appreciated with reference to FIG. 6. Preferably, a first pressing operation is performed upon the laminated glass panel 10 by a first pair of confronting press members 72 when the panel 10 is at a temperature of between about 110° F. and about 150° F., and perhaps more preferably between about 130° F. and about 140° F. A second pressing operation is desirably performed upon the laminated glass panel 10 by a second pair of confronting press members 74 when the panel 10 is at a temperature of between about 130° F. and about 180° F., and perhaps more preferably between about 150° F. and about 160° F. A third pressing operation is desirably performed on the laminated glass panel 10 by a third pair of confronting press members 76 when the panel 10 is at a temperature of between about 150° F. and about 220° F., and perhaps more preferably between about 180° F. and about 190° F. A fourth pressing operation is preferably performed on the laminated glass panel 10 by a fourth pair of confronting press members 78 when the panel 10 is at a temperature of between about 180° F. and about 250° F., and perhaps more preferably between about 210° F. and about 220° F. A fifth pressing operation is preferably performed on the laminated glass panel 10 by a fifth pair of confronting press members 80 when the panel 10 is at a temperature of between about 210° F. and about 280° F., and perhaps more preferably between about 240° F. and about 250° F. A sixth pressing operation is preferably performed on the laminated glass panel 10 by a sixth pair of confronting press members 82 when the panel 10 is at a temperature of between about 230° F. and about 300° F., and perhaps more preferably between about 260° F. and about 270° F. In these particularly preferred methods, other pressing operations can also be performed upon the laminated glass panel 10, if so desired. For example, it may be particularly advantageous to provide one, two, or three cool-down ovens (each optionally followed by a confronting pair of press members) following the described sixth pressing operation, wherein the temperature of the laminated glass panel 10 is gradually decreased as it is conveyed through such cool-down oven or ovens.

As noted above, the confronting press members can be nip rollers. Thus, certain methods of the invention involve conveying a laminated glass panel between confronting nip rollers while simultaneously pressing the laminated glass panel with the nip rollers. In certain preferred methods, the nip rollers are operated to provide a foot path on the laminated glass panel (during the pressing operation) of at least about 0.5 inch, perhaps more preferably at least about 1 inches, and perhaps optimally at least about 2 inches. In certain particularly preferred methods, in combination with using a particularly large foot path, the laminated glass panel is conveyed at a particularly high overall rate (e.g., at least about 15 feet per minute, and perhaps more preferably at least about 20 feet per minute).

During certain preferred pressing operations, the air cylinders are operated to apply pressure via the nip rollers to the laminated glass panel. These air cylinders are preferably operated such that the nip rollers apply to the laminated glass panel pressure of between about 60 pounds per linear inch and about 120 pounds per linear inch, and perhaps optimally between about 80 pounds per linear inch and about 85 pounds per linear inch. As described above, this pressure is greater than that applied in conventional laminated glass production methods. Further, other ranges have also been surprisingly discovered to give particularly good results, as described below.

In one particular embodiment of the invention, the following arrangement is used for a production line of the invention: six radiant ovens each oven provided with tubular quartz medium range infrared heating elements positioned above and below the path of substrate travel, each oven being followed by one pair of nip rollers having a diameter of 16 inches and a roll cover (comprising EPDM rubber having a durometer of about 60) having a radial thickness of about 2.0 inches, each upper nip roller being operatively coupled with a pair of air cylinders. The first oven of the production line is about 20 feet in length and has heating elements configured in a high intensity pattern such that the temperature of the laminated glass panel is brought to a temperature of about 130° F. upon reaching the end of this oven. A pressing operation is thus performed by the first pair of confronting nip rollers while the laminated glass panel is at a temperature of about 130° F. The second oven of the production line is about 10 feet in length and has heating elements configured in a high intensity pattern such that the temperature of the laminated glass panel is brought to a temperature of about 160° F. upon reaching the end of this oven. A pressing operation is thus performed by the second pair of confronting nip rollers while the laminated glass panel is at a temperature of about 160° F. The third oven of the production line is about 10 feet in length and has heating elements configured in a medium intensity pattern such that the temperature of the laminated glass panel is brought to a temperature of about 185° F. upon reaching the end of this oven. A pressing operation is thus performed by the third pair of confronting nip rollers while the laminated glass panel is at a temperature of about 185° F. The fourth oven of the production line is about 10 feet in length and has heating elements configured in a medium intensity pattern such that the temperature of the laminated glass panel is brought to a temperature of about 215° F. upon reaching the end of this oven. A pressing operation is thus performed by the fourth pair of confronting nip rollers while the laminated glass panel is at a temperature of about 215° F. The fifth oven of the production line is about 10 feet in length and has heating elements configured in a medium intensity pattern such that the temperature of the laminated glass panel is brought to a temperature of about 245° F. upon reaching the end of this oven. A pressing operation is thus performed by the fifth pair of confronting nip rollers while the laminated glass panel is at a temperature of about 245° F. The sixth oven of the production line is about 10 feet in length and has heating elements configured in a low intensity pattern such that the temperature of the laminated glass panel is brought to a temperature of about 270° F. upon reaching the end of this oven. A pressing operation is thus performed by the sixth pair of confronting nip rollers while the laminated glass panel is at a temperature of about 270° F. Each nip roller comprises a steel cylinder having diameter of about 16 inches and a roll cover (comprising EPDM rubber having a durometer of about 60) having a radial thickness of about 2.0 inches, wherein each pair of confronting nip rollers is mounted to provide a separation distance of about 0.1 inch. Each of the two air cylinders on each upper nip roller is an 8 inch air cylinder. These air cylinders are operated such that a pressure of about 85 pounds per linear inch is applied to the laminated glass panel during each pressing operation. The path of substrate travel, defined by a plurality of transport rollers, has a length of about 80 feet, and the transport rollers are operatively connected to variable speed motors such that the laminated glass panel is conveyed along the path of substrate travel at an overall rate about 20 feet per minute. In particular, the laminated glass panel is conveyed at varying speeds along the production line with the first, second, third, and fourth ovens being set at a first speed, while the fifth and sixth ovens being set at a second speed about 15% less than the first speed. The laminated glass panel comprises an ionoplast interlayer positioned between two glass sheets and has a thickness of about 0.3 inch. Under these conditions, there is achieved a foot path of about 2.0 inches when the laminated glass panel is conveyed between each pair of confronting press members.

Figure 7:
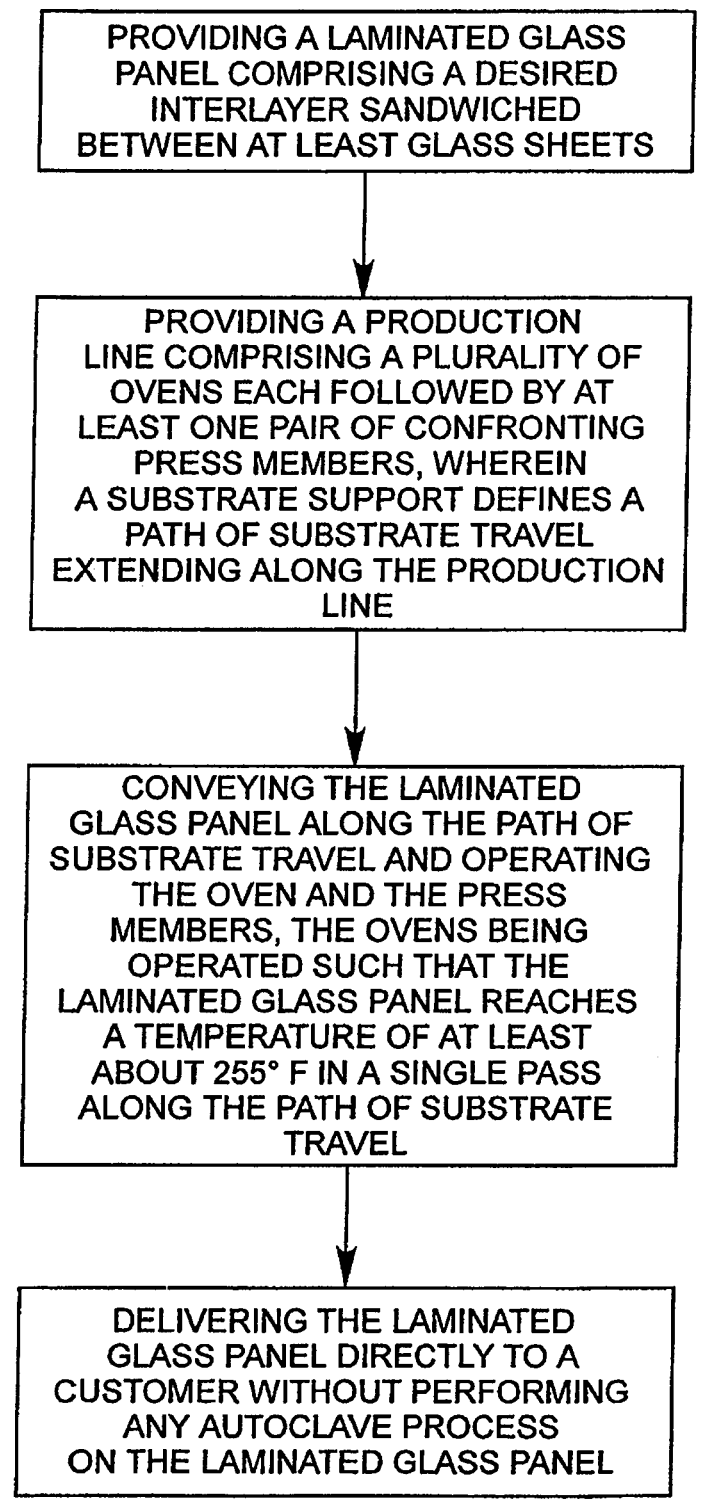
FIG. 7 is a flow chart exemplifying a method in accordance with certain embodiments of the invention.

It is to be understood that the present method is a non-autoclave production method. In this method, the laminated glass panel is preferably maintained at an ambient atmospheric pressure at all times during the production method. Thus, the laminated glass panel is not subjected to an elevated atmospheric pressure, as is characteristic of autoclave methods, nor is the laminated glass panel subjected to a vacuum, as is characteristic of the non-autoclave methods described above. FIG. 7 exemplifies certain methods of the invention wherein following removal of laminated glass panels from the production line (e.g., upon reaching the end of the path of substrate travel), the laminated glass panels are delivered to a customer without performing any autoclave process on the laminated glass panels. Embodiments of this nature are particularly preferred.

Currently, predominantly all (if not all) commercially available laminated glass is produced by an autoclave process. Skilled artisans may generally expect the non-autoclave laminated glass panels to be of inferior quality, since these panels are not treated under super-atmospheric pressure in an autoclave. Surprisingly, the inventors have discovered that the present non-autoclave methods yield laminated glass panels that are just as good, if not better, than laminated glass panels produced using an autoclave. Producing laminates with optimal safety and appearance properties involves producing laminates that meet, and typically exceed, industry standards. One such industry standard for laminated glass panels is ANSI Z97.1, in accordance with the American National Standards Institute. In conformance with ANSI Z97.1, two tests, a boil test and a bag drop test, are routinely used to test laminated glass produced using conventional autoclave processes. These tests are performed to ensure that laminated glass meets the appearance and safety (adhesion) standards of the industry. Generally, in order to satisfy the above-mentioned boil test, the panel must be free of air bubbles beyond 0.5 inch from any outer edge of the laminate after conducting the test. Generally, in order to satisfy the above-mentioned bag drop test, the panel must withstand a 100 pound bag dropped from a 48 inch height without creating a hole therein that a 3" sphere can pass through. Both in terms of appearance and safety, the laminated glass panels produced using the present invention exhibit test values that meet, and often exceed these acceptable industry standards adopted for these properties.

In certain embodiments of the invention, variations are advantageously made to production parameters noted above. Following such variations, the laminated glass panels 10 produced from such line meet, and often exceed the acceptable industry standards described above. One of the elements that can be varied is the temperature of the ovens. Other elements that can also be varied include the pressure exerted by the confronting press members and the rate at which the motorized rollers are adapted to convey the laminated glass panel. In the present embodiments, the ovens are preferably adapted for heating a laminated glass panel to a temperature of at least about 200 degrees Farenheit in a single pass along the path of substrate travel. For example, the laminated glass panel can optionally be heated to a temperature (e.g., a maximum temperature) of between about 200° F. and about 280° F. during a single pass along the path of substrate travel and/or during a single pass of the panel through the production line. Perhaps more preferably, the laminated glass panel is heated to a maximum temperature of between about 200° F. and about 235° F. (and perhaps optimally between 210° F. and about 235° F.) during a single pass along the path of substrate travel. In contrast, in conventional autoclave methods, the laminated glass panels are commonly brought to a temperature of about 120° F.–170° F. when conveyed through the preheat tacking oven or ovens.

Figure 8:
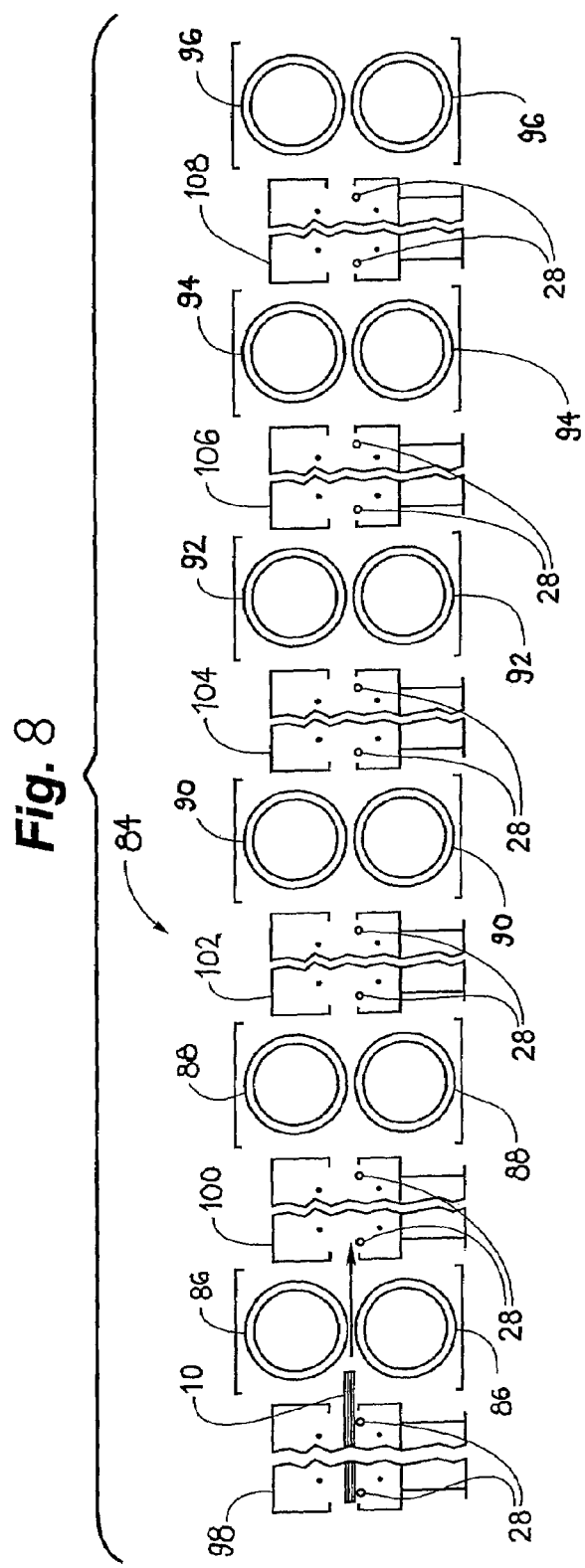
FIG. 8 is a partially broken away, schematic, cross-sectional side view of a production line in accordance with certain embodiments of the invention.

The production line 84 shown in FIG. 8 in the present embodiments preferably comprises at least three ovens (perhaps more preferably at least six ovens, e.g., between six and nine ovens) each followed by at least one pair of confronting press members. In these embodiments, the production method involves conveying the laminated glass panel through each of the ovens and between each pair of confronting press members (i.e., between confronting surfaces of the rollers of each pair).

In certain particularly preferred methods, pressing operations are performed on the laminated glass panel by the confronting press members (e.g., nip rollers) when the panel is at particular temperatures. This is perhaps best appreciated with reference to FIG. 8. Preferably, a first pressing operation is performed upon the laminated glass panel 10 by a first pair of confronting press members 86 when the panel 10 is at a temperature of between about 120° F. and about 150° F., and perhaps more preferably about 130° F. A second pressing operation is desirably performed upon the laminated glass panel 10 by a second pair of confronting press members 88 when the panel 10 is at a temperature of between about 140° F. and about 170° F., and perhaps more preferably about 150° F. A third pressing operation is desirably performed on the laminated glass panel 10 by a third pair of confronting press members 90 when the panel 10 is at a temperature of between about 160° F. and about 190° F., and perhaps more preferably about 170° F. A fourth pressing operation is preferably performed on the laminated glass panel 10 by a fourth pair of confronting press members 92 when the panel 10 is at a temperature of between about 180° F. and about 210° F., and perhaps more preferably about 190° F. A fifth pressing operation is preferably performed on the laminated glass panel 10 by a fifth pair of confronting press members 94 when the panel 10 is at a temperature of between about 200° F. and about 230° F., and perhaps more preferably about 210° F. A sixth pressing operation is preferably performed on the laminated glass panel 10 by a sixth pair of confronting press members 96 when the panel 10 is at a temperature of between about 220° F. and about 250° F., and perhaps more preferably about 230° F. In these methods, other pressing operations can also be performed upon the laminated glass panel 10, if so desired. For example, it may be particularly advantageous to provide one, two, or three cool-down ovens (each optionally followed by a confronting pair of press members) following the described sixth pressing operation, wherein the temperature of the laminated glass panel 10 is gradually decreased as it is conveyed through such cool-down oven or ovens.

As noted above, the confronting press members can be nip rollers. Thus, certain methods of the invention involve conveying a laminated glass panel between confronting nip rollers while simultaneously pressing the laminated glass panel with the nip rollers. In certain preferred methods, the nip rollers are operated to provide a foot path on the laminated glass panel (during the pressing operation) of at least about 0.5 inch, perhaps more preferably at least about 2 inches, and perhaps optimally at least about 3 inches. In certain particularly preferred methods, in combination with using a particularly large foot path, the laminated glass panel can be conveyed at an overall rate of at least about 5 feet per minute. For example, certain embodiments involve a rate ranging between about 5 feet per minute and about 15 feet per minute. Certain embodiments requiring a faster conveyance of the laminated glass panel involve a rate ranging between about 15 feet per minute and about 30 feet per minute.

During certain preferred pressing operations, the air cylinders are operated to apply pressure via the nip rollers to the laminated glass panel. These air cylinders are preferably operated such that the nip rollers apply to the laminated glass panel pressure of between about 20 pounds per linear inch and about 250 pounds per linear inch, and perhaps optimally between about 140 and about 160 pounds per linear inch. As described above, this pressure is believed to be greater than that applied in conventional laminated glass production methods.

In one particular embodiment of the invention, the following arrangement is used for a production line of the invention: six radiant ovens each oven provided with tubular quartz medium range infrared heating elements positioned above and below the path of substrate travel, each oven being followed by one pair of nip rollers having a diameter of 16 inches and a roll cover (comprising EPDM rubber having a durometer of about 60) having a radial thickness of about 2.0 inches, each upper nip roller being operatively coupled with a pair of air cylinders. A first oven 98 of the production line 84 is about 20 feet in length and has heating elements configured in a high intensity pattern such that the temperature of the laminated glass panel is brought to a temperature of about 130° F. upon reaching the end of this oven. A pressing operation is thus performed by the first pair of confronting nip rollers while the laminated glass panel is at a temperature of about 130° F. A second oven 100 of the production line 84 is about 10 feet in length and has heating elements configured in a high intensity pattern such that the temperature of the laminated glass panel is brought to a temperature of about 150° F. upon reaching the end of this oven. A pressing operation is thus performed by the second pair of confronting nip rollers while the laminated glass panel is at a temperature of about 150° F. A third oven 102 of the production line 84 is about 10 feet in length and has heating elements configured in a medium intensity pattern such that the temperature of the laminated glass panel is brought to a temperature of about 170° F. upon reaching the end of this oven. A pressing operation is thus performed by the third pair of confronting nip rollers while the laminated glass panel is at a temperature of about 170° F. A fourth oven 104 of the production line 84 is about 10 feet in length and has heating elements configured in a medium intensity pattern such that the temperature of the laminated glass panel is brought to a temperature of about 190° F. upon reaching the end of this oven. A pressing operation is thus performed by the fourth pair of confronting nip rollers while the laminated glass panel is at a temperature of about 190° F. A fifth oven 106 of the production line 84 is about 10 feet in length and has heating elements configured in a medium intensity pattern such that the temperature of the laminated glass panel is brought to a temperature of about 210° F. upon reaching the end of this oven. A pressing operation is thus performed by the fifth pair of confronting nip rollers while the laminated glass panel is at a temperature of about 210° F. A sixth oven 108 of the production line 84 is about 10 feet in length and has heating elements configured in a low intensity pattern such that the temperature of the laminated glass panel is brought to a temperature of about 230° F. upon reaching the end of this oven. A pressing operation is thus performed by the sixth pair of confronting nip rollers while the laminated glass panel is at a temperature of about 230° F. Each nip roller comprises a steel cylinder having diameter of about 16 inches and a roll cover (comprising EPDM rubber having a durometer of about 60) having a radial thickness of about 2.0 inches, wherein each pair of confronting nip rollers is mounted to provide a separation distance of about 0.1 inch. Each of the two air cylinders on each upper nip roller is an 8 inch air cylinder. These air cylinders are operated such that a pressure of about 150 pounds per linear inch is applied to the laminated glass panel during each pressing operation. The path of substrate travel, defined by a plurality of transport rollers, has a length of about 80 feet, and the transport rollers are operatively connected to variable speed motors such that the laminated glass panel is conveyed along the path of substrate travel at an overall rate of about 5 feet per minute. The laminated glass panel comprises an ionoplast interlayer positioned between two glass sheets and has a thickness of about 0.3 inch. Under these conditions, there is achieved a foot path of about 3 inches when the laminated glass panel is conveyed between each pair of confronting press members.

Figure 9:
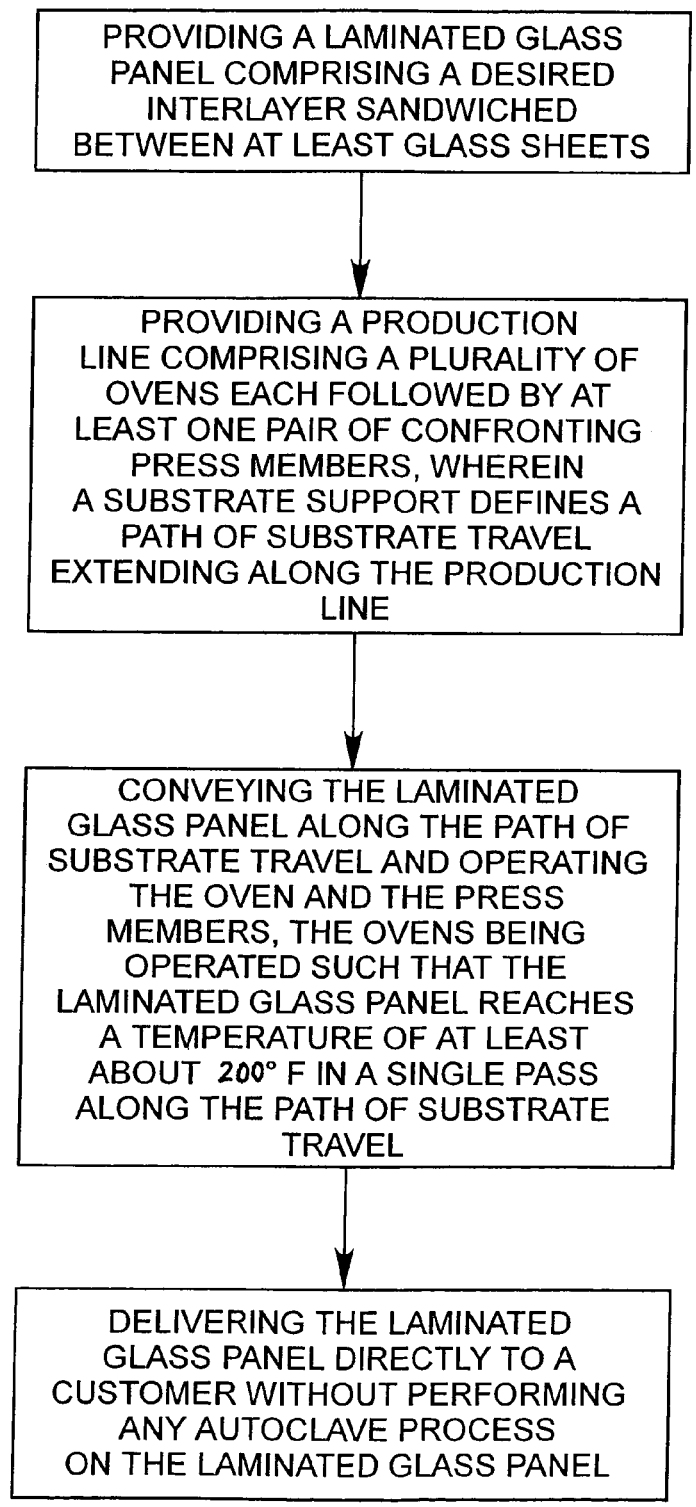
FIG. 9 is a flow chart exemplifying a method in accordance with certain embodiments of the invention.

It is to be understood that the present method is a non-autoclave production method. In this method, the laminated glass panel is preferably maintained at an ambient atmospheric pressure at all times during the production method. Thus, the laminated glass panel is not subjected to an elevated atmospheric pressure, as is characteristic of autoclave methods, nor is the laminated glass panel subjected to a vacuum, as is characteristic of the non-autoclave methods described above. FIG. 9 exemplifies certain methods of the invention wherein following removal of laminated glass panels from the production line (e.g., upon reaching the end of the path of substrate travel), the laminated glass panels are delivered to a customer without performing any autoclave process on the laminated glass panels. Embodiments of this nature are particularly preferred.

In methods involving a single pass of the laminate along the path of substrate travel, the laminate can optionally be stopped, moved backward (e.g., back and forth), etc. as desired for a given process. While preferred embodiments of the present invention have been described, it should be understood that a variety of changes, adaptations, and modifications can be made therein without departing from the spirit of the invention and the scope of the appended claims.

What is claimed is:

1. A production line for producing non-autoclave laminated glass, the production line comprising at least four ovens each followed by at least one pair of confronting press members between which laminated glass panels can be positioned during pressing operations, wherein a substrate support defines a path of substrate travel extending through the ovens and between each pair of confronting press members, each of the ovens having a length of at least 10 feet, and wherein the ovens are adapted for heating a laminated glass panel to a maximum temperature of between about 200 degrees Fahrenheit and about 235 degrees Fahrenheit in a single pass along the path of substrate travel.

2. The production line of claim 1 wherein the ovens are radiant ovens.

3. The production line of claim 1 wherein the production line is provided in assembly with a laminated glass panel, the panel being supported on top of the substrate support, the panel comprising two sheet-like substrates and an interlayer sandwiched between the substrates, wherein the interlayer comprises a film comprising ionoplast plastic.

4. The production line of claim 1, wherein each of the pair of confronting press members has a diameter of at least 12 inches.

5. The production line of claim 1 wherein the path of substrate travel has a length of at least about 50 feet.

6. The production line of claim 5 wherein the path of substrate travel has a length of between about 55 feet and about 95 feet.

7. The production line of claim 1 wherein each oven comprises a plurality of spaced-apart heating elements, the heating elements being positioned below and/or above the path of substrate travel.

8. The production line of claim 7 wherein at least some of the heating elements are quartz tube heating elements.

9. The production line of claim 1 wherein a first of the ovens has a length of about 20 feet.

10. The production line of claim 9 wherein a second of the ovens has a length of about ten feet.

11. The production line of claim 10 wherein a third of the ovens has a length of about ten feet.

12. The production line of claim 11 wherein a fourth of the ovens has a length of about ten feet.

13. The production line of claim 12 wherein a fifth of the ovens has a length of about ten feet.

14. The production line of claim 13 wherein a sixth of the ovens has a length of about ten feet.

* * * * *